Figure 1:
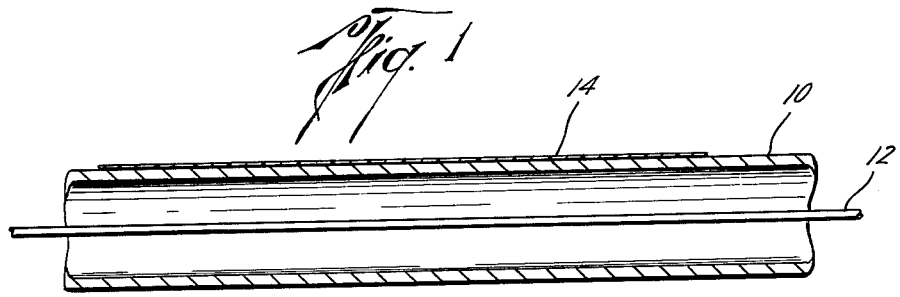

John C. Allred
Nadim E. Nasir
INVENTORS

BY
ATTORNEYS

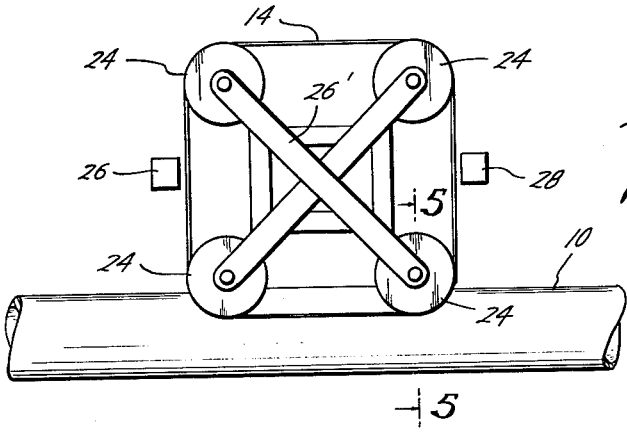
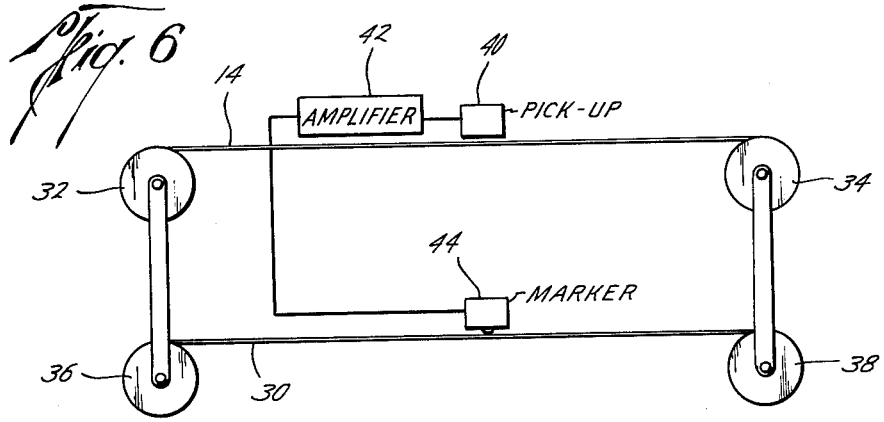
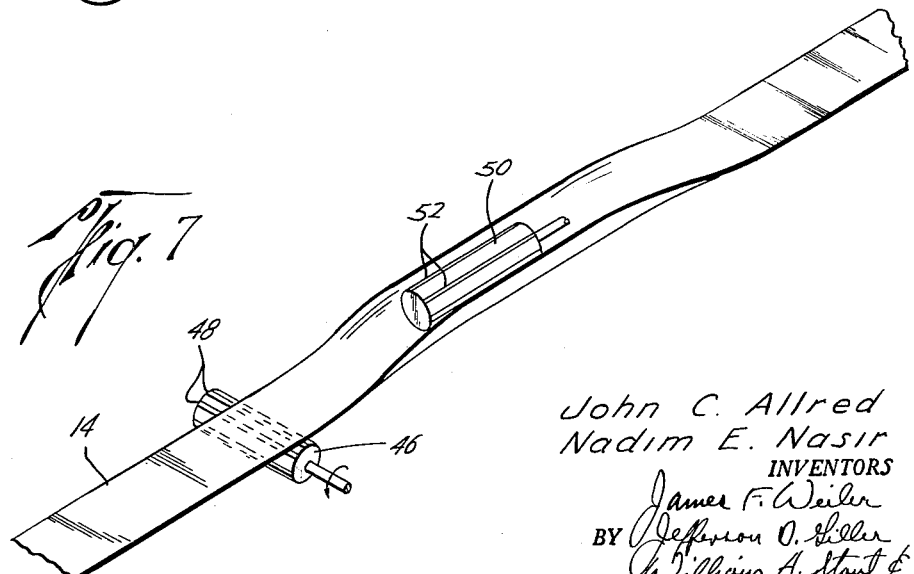

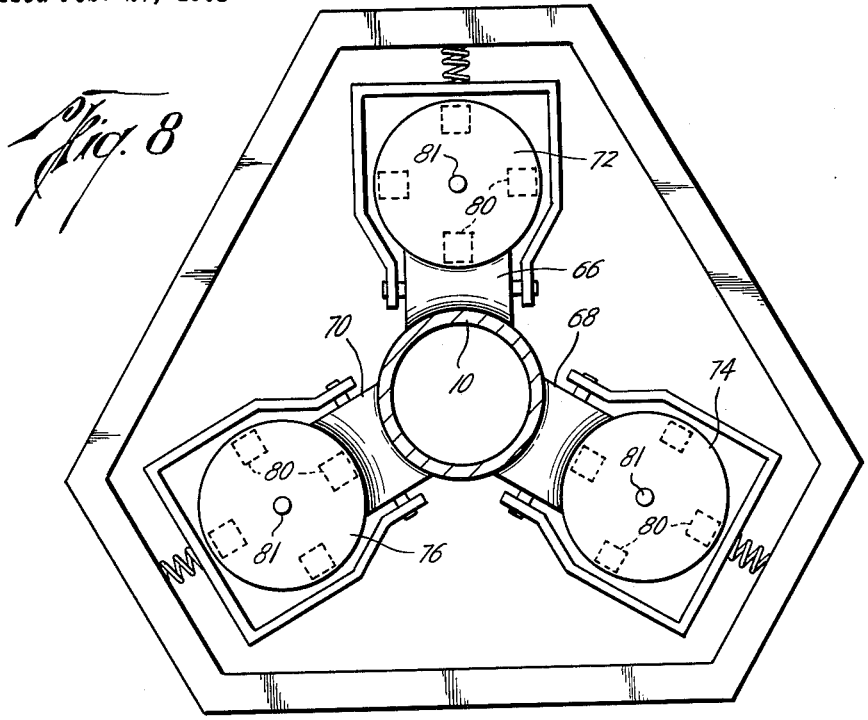
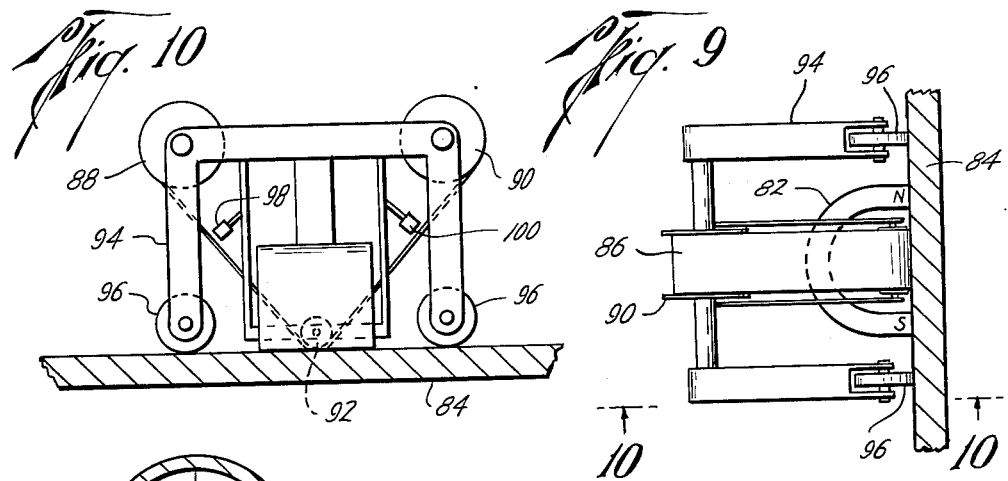
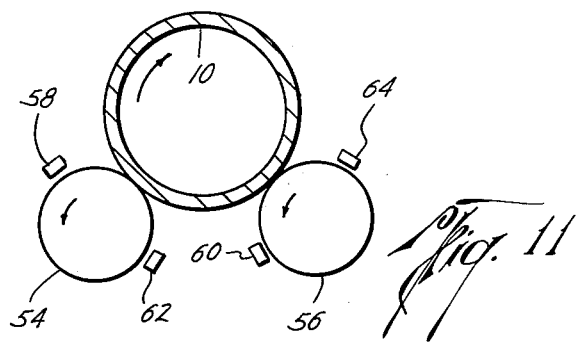
John C. Allred
Nadim E. Nasir
INVENTORS

United States Patent Office 3,262,053
Patented July 19, 1966

3,262,053
METHOD OF AND APPARATUS FOR MAGNETICALLY DETECTING FLAWS IN FERROMAGNETIC OBJECTS BY SUPERIMPOSING MAGNETIC TAPES OR ROLLERS THEREON
Nadim E. Nasir and John C. Allred, Houston, Tex., assignors, by mesne assignments, to American Machine & Foundry Company, New York, N.Y., a corporation of New Jersey
Filed Feb. 27, 1961, Ser. No. 91,751
9 Claims. (Cl. 324—37)

The present invention relates to a method of and apparatus for magnetically testing ferromagnetic objects for flaws, and more particularly relates to such a method and apparatus wherein a demagnetized ferromagnetic body is placed adjacent a ferromagnetic object to be tested which has been magnetized, thereby detecting and recording variations in the magnetic flux in the ferromagnetic body which can then be caused to reveal and locate flaws in the object being tested.

The nondestructive testing of ferromagnetic objects by the use of a magnetic tape to detect flaws has previously been disclosed as shown by the patent to Kodis, No. 2,648,435. The present invention is directed to such nondestructive testing by inducing a magnetic pattern in a nonmagnetized ferromagnetic body in response to the magnetic field existing in the ferromagnetic object being tested. Since the magnetic field of the ferromagnetic object being tested is dependent upon the structure of the object, any imperfections, flaws or other structural variatioins will affect the magnetic field of the tested object and thus also the magnetic pattern introduced or induced in the demagnetized ferromagnetic testing means.

It is an object of this invention to provide a method of and an apparatus for detecting both the presence of and the location of flaws in ferromagnetic objects.

A further object of the present invention is the provision of a method of and an apparatus for magnetically inspecting ferromagnetic materials wherein the material is magnetized, and a demagnetized magnetic tape, rollers whose peripheral surface is comprised of magnetizable particles or other similar means, is placed in stationary contact with or in close proximity to the object being inspected, either during or after magnetization of the specimen. Flaws in the specimen produce irregularities in the magnetic field of the specimen and these variations are induced in the tape or other means, these variations are then detected and their position on the tape or other means is noted from which the exact position of the flaw in the specimen can be determined.

Another object of the present invention is to place a section of magnetic tape or magnetizable roller in contact with a test specimen along its length or by wrapping it around the test specimen and thereafter noting the signal induced in the magnetic tape and determining the location of the flaw in the specimen by the location of the signal in the magnetic tape or other means.

Yet a still further object of the present invention is a provision of a method of and an apparatus for magnetically inspecting a test specimen in which a demagnetized ferromagnetic means is placed adjacent the magnetized test specimen, the ferromagnetic means is tested to locate the flaws induced in the ferromagnetic means, and a paper tape is marked in accordance with the flaws detected upon the ferromagnetic tape and the marked paper tape may then be placed upon the test specimen in the same position as the ferromagnetic tape when it was detecting the flaws and thus by correlating the positions of the mark on the paper tape the position of the flaws on the test specimen can be determined.

Yet a further object of the present invention is the provision of a method of and an apparatus for magnetically inspecting ferromagnetic specimens wherein the magnetic means in which the magnetic field has been induced is inspected in both a transverse and longitudinal direction to insure that all flaws recorded on the ferromagnetic means are detected.

A still further object of the present invention is a provision of an apparatus for and a method of inspecting the induced magnetic field in a ferromagnetic means in which a rotating inspection head is rotated adjacent the ferromagnetic means to increase the sensitivity of detection.

Yet a further object of the present invention is a provision of a method for and an apparatus of magnetically inspecting ferromagnetic objects in which the magnetic tape, rollers or other means will match the contour of the test specimen and in which rotating pickup detectors conform to the contour of the tape or other rollers for insuring accuracy and sensitivity.

A still further object of the present invention is a provision of a method for and an apparatus of magnetically inspecting objects in which a demagnetized ferromagnetic surface is passed over the test specimen which has been magnetized and slippage is prevented between the ferromagnetic surface and the test specimen whereby a detected flaw signal which is induced in the demagnetized ferromagnetic surface can be easily correlated with the position of the ferromagnetic surface on the test specimen to locate the exact position of the flaw in the test specimen.

Yet a further object of the present invention is a provision of an apparatus for and a method of testing ferromagnetic objects in which the magnetizing force used to magnetize the test specimen is also used to support the ferromagnetic test means adjacent the test specimen.

Figure 2:
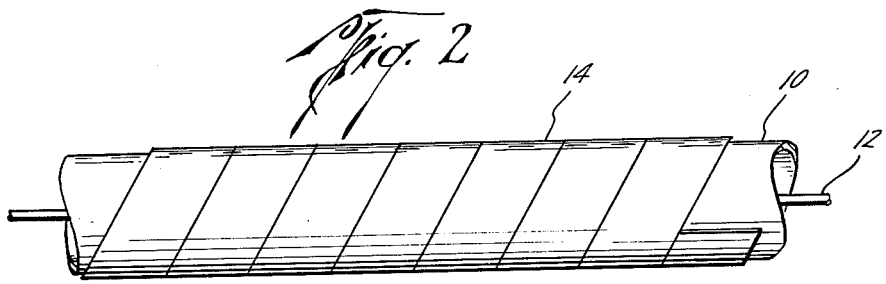
Figure 3:
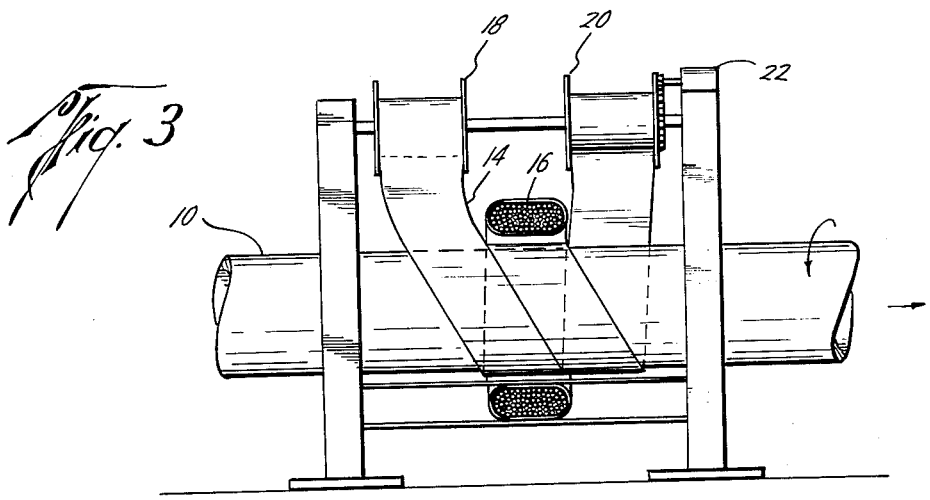
Figure 5:
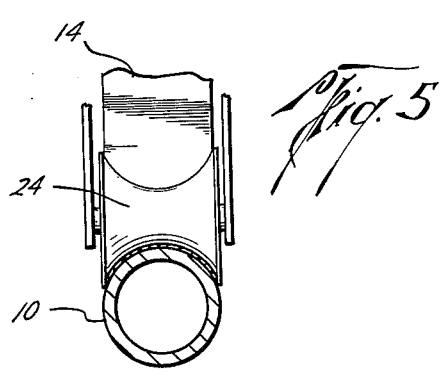

Other and further objects, features and advantages will be apparent from the following description of presently preferred embodiments of the invention, given for the purpose of disclosure, and taken in conjunction with the accompanying drawings, where like character references designate like parts throughout the several views and where, FIGURE 1 is a schematic elevational view illustrating one method of magnetically inspecting a ferromagnetic body such as pipe, FIGURE 2 is an elevational view, partly in section, illustrating another method of magnetically inspecting a pipe, FIGURE 3 is an elevational view, illustrating an apparatus for magnetizing and detecting flaws in a pipe, FIGURE 4 is a schematic view, in elevation, illustrating another apparatus and method of magnetically locating flaws in a ferromagnetic object, FIGURE 5 is a cross-sectional view, taken along the line 5 of FIGURE 4, FIGURE 6 is a schematic view of an alternate form of a method and apparatus used in locating the position of a detected flaw in a test specimen, FIGURE 7 is a perspective view, in schematic, illustrating one form of detecting the flaw signals induced in a magnetic tape, FIGURE 8 is an end view, in schematic, illustrating a method of locating flaws in a pipe structure by the use of magnetically contoured rollers, FIGURE 9 is an elevational view illustrating a method of and apparatus for utilizing the magnetic flux which magnetizes the test specimen to also support the test equipment on the test specimen, FIGURE 10 is a cross-sectional view taken along the line 10 of FIGURE 9, and FIGURE 11 is a schematic end view illustrating the method of and apparatus for inspecting the circumference pipe by the use of magnetic rollers.

The present invention is directed to the magnetic inspection of a test specimen 10 which has been magnetized by any conventional means 12. A suitable demagnetized ferromagnetic body 14 is placed in contact on or close proximity to the test specimen being inspected. It is noted that there is no slippage between the surfaces of the specimen 10 and the body 14. The flaws in the test specimen 10 produce irregularities in the magnetic field of the test specimen and these variations are induced in a demagnetized ferromagnetic means 14 which can then be itself inspected and the flaw variations noted and their location on the means 14 can be correlated with the original position of the means 14 on the test specimen 10 to locate and determine the exact position of the flaw in the test specimen 10.

Referring now to FIGURE 1, the test specimen is shown as a pipe 10 although other shapes and ferromagnetic objects can be tested. The test specimen 10 is here magnetized by passing an electrical current through a magnetizing means, here shown as conductor 12 which creates a magnetic field that is induced in the test specimen 10. A piece of demagnetized magnetic tape 14 is laid lengthwise on the test specimen 10 whereby the flaws in the test specimen will produce irregularities of magnetization in adjacent portions of the magnetic tape 14. This tape can then be placed in a conventional or other appropriate play back device wherein variations due to the flaws are detected and their location with reference to the tape is noted. As shown in FIGURE 2, the tape 14 may be spirally wrapped around the specimen 10 instead of being placed lengthwise or longitudinally as shown in FIGURE 1.

Referring to FIGURE 3, a method and apparatus for placing the magnetic tape 14 in physical contact with the test specimen 10 is shown. Here, the pipe 10 is shown as being magnetized by a magnetizing core 16, although any suitable or conventional magnetizing means such as an electromagnet, permanent magnet, or by passing a current directly through the specimen may be used. The magnetic tape 14 is wrapped on a reel 18, spirally wrapped one or more turns around the test specimen 10 and attached to a reel 20. Thus as the pipe 10 is rotated and longitudinally moved, as indicated by the arrows, the magnetic tape 14 will wrap around the outer surface of the specimen 10 and unwind and be placed upon reel 20. Thus a length of test specimen pipe 10 may be quickly and completely covered and inspected very quickly. If desired, a motor 22 can be used to drive both reels 18 and 20 in synchronism with any desired mechanism for rotating and moving the pipe through the testing apparatus.

Referring now to FIGURES 4 and 5, another method and apparatus for detecting flaws in a test specimen 10 is shown. In this case the apparatus may be moved longitudinally along a curved pipe 10 for inspecting only the pipe seam or it can be moved down the pipe, the pipe rotated and the device can be again moved along the pipe in order to cover the entire circumference of the specimen 10 in several sweeps. As shown, the magnetic tape 14 is a closed loop extending around a plurality of rotatable wheels 24 which are suitably supported by structure 26'. As noted in FIGURE 5, the wheels 24 have a contour complementing the curved surface of the pipe 10 whereby the tape 14 is shaped so as to fit the contour of the test specimen being tested. Also a conventional magnetic pickup head 26 and magnetic eraser 28 may be used. The pickup 26 will pick up flaw variations in the tape 14 as they pass the pickup head 26 and these variations can be located directly on the pipe 10 by measuring the distance between the last point of contact of the tape 14 and the surface of pipe 10 and the point on the tape opposite pick-up head 26. The flaw is then located at a point equal to this determined distance back along the surface of the pipe from the last point of contact of the tape 14 and the surface of the pipe. The eraser 28 erases previously detected flux signals thereby permitting continuous operation of the magnetic loop tape 14. Of course, the pickup head 26 and the eraser 28 could be omitted and one of the upper wheels could be used to wind and the other upper wheel used to unwind a long roll of tape which could be used with this apparatus and after making a run the tape could be removed and passed through a conventional pickup apparatus to detect the flaw signals and these could be correlated by their position on the tape to locate the exact spot of the flaw in the pipe 10.

Referring now to FIGURE 6, an apparatus and method is shown for conveniently marking the detected flaw signals on the test specimens. As previously mentioned, the magnetic tape 14 such as shown in FIGURES 1 through 5 could be removed from the pipe after a test, the tape 14 passed through a pickup apparatus, the flaw signals noted with relation to the tape, and the tape could be relaid on the test specimen 10 and the exact positions of the flaws noted on the test specimen.

As shown in FIGURE 6, however, the information induced on the magnetic tape 14 may be transferred to a paper tape 30 which can then be used to be placed on the test specimen to locate the exact position of the flaw. In addition, the paper tape 30 may be used as a permanent record for future study of the test specimen while the magnetic tape 14 is being erased and used on another job. As schematically shown in FIGURE 6, the magnetic tape 14 having the induced flaw signals therein, is placed upon a reel 32 and passed to and wound on a reel 34. Paper tape 30 is placed on reel 36 which is preferably connected to reel 32 and the paper tape is then rolled on reel 38 which is preferably connected to magnetic tape reel 34. Thus, both the magnetic tape 14 and paper tape 30 travel at the same speed. As the magnetic tape 14 passes under pickup head 40, the flaw signals therein are detected, passed through a suitable amplifier 42, and then to a suitable marking machine 44, which marks the paper tape 30 corresponding to the detected flaws. Thus, the paper tape 30 can then be laid or wound onto the specimen 10 in the same position and manner as the magnetic tape 14 as when the signals were induced therein and a precise location of the flaws can be located on the test specimen 10.

The method of passing a magnetic tape by a stationary detector or pickup head has not been satisfactory for several reasons. First, the relative speed between the tape and the pickup head has not been high enough in many instances to provide a satisfactory reading. Secondly, the pickup head because of its position respective to the magnetic tape is not able to detect the magnitude of all the flaws. That is, if the flaw on the magnetic tape is longitudinally passed through the detector, a certain signal will be received. However, if the same size flaw is passed transversely across the detector, the detector signal will be greatly reduced thus allowing the detector to miss transverse flaws. Thus, the sensitivity can be increased by using two detectors which scan the magnetic tape at higher speeds by rotating the detector heads and which detect all the flaws by providing that one pickup head will scan in a transverse direction while the other head will scan the tape in a longitudinal direction.

Referring now to FIGURE 7, a preferred method and apparatus for detecting the induced flaw signals from magnetic tape 14 is best seen. A first rotating detector head 46 is provided which is rotated by a suitable means and is transversely mounted adjacent the magnetic tape 14. A plurality of longitudinally extending pickup detectors 48 are suitably mounted in the rotating head 46, although any desired number may be used. Thus, the detectors 48 as they are rotated across the surface of the magnetic tape 14 provide a sensitive means for detecting any magnetic variations that are perpendicular or transverse to the tape 14.

Similarly, a rotating head 50 is provided adjacent to, but longitudinally mounted for read out along the magnetic tape 14. Similarly, a single or a plurality of pickup detectors 52 are longitudinally mounted on the rotating head 50. It is noted that all sections of the tape 14 are spaced an equal distance from the detectors 48 as the tape passes adjacent the rotating head 46. In order to have the tape equally distant from the detectors 52 on the rotating head 50 it is necessary that the tape 14 be curved as at 52 by any suitable means so that all portions of the tape being scanned by the rotating head 50 will be at equal distances from the detectors 52 in order to provide a uniform scanning distance.

Also, if desired, the demagnetized ferromagnetic body into which the flux variations are induced may be in the form of rollers instead of lengthy tapes. Referring to FIGURE 11, rollers 54 and 56 are provided which may carry a closed loop of tape on their circumference or be suitable plastic or rubber rollers with any suitable ferromagnetic material such as $Fe_3O_4$ or ferrites embedded therein. In this case suitable pickups 58 and 60 are provided to detect the flux variations and suitable erasers 62 and 64 are provided to erase the previous signal and demagnetize the circumference of the roller in preparation for that section again being placed in contact with the test specimen 10. Of course, it is not necessary to inspect the same portion of the test specimen 10 by both rollers 54 and 56 and therefore one of the rollers can be offset with respect to the other. And while only a single inspection roller need be used the dual arrangement as shown in FIGURE 11 is satisfactory as the inspection rollers 54 and 56 provide a rotating support for the test specimen 10 as it is rotated and moves across the rollers. For a quick method of detecting and marking the test specimen 10 the pickups 58 and 60 may sound an alarm so that the specimen may be suitably marked or the pickups may directly actuate a marker (not shown) on the test specimen itself.

Referring now to FIGURE 8, a schematic is shown of another structure using magnetic rollers which are passed longitudinally along a pipe specimen 10 to detect flaws in the pipe 10. Any suitable number of rollers, here shown as three, is provided. Rollers 66, 68 and 70 are here shown as being equally spaced around the circumference of the pipe 10 at 120°. Of course, rollers 66, 68 and 70 could be enlarged to encompass the entire circumference of the pipe 10 if desired or another set of similar rollers which are offset by 60° could be similarly moving on the pipe 10 to cover the entire circumference of the pipe if desired. It is noted that the rollers 66, 68 and 70 all have contours complementing the curved surface of the pipe 10. As the speed of these magnetic rollers along the pipe 10 may not be sufficient to generate the desired signal in a pickup head a rotating head is provided. Thus, rotating heads 72, 74 and 76 which include a suitable number of detectors 80, here shown as four, are suitably mounted for transverse rotation about axes 81 across the periphery of their respective rollers. Similarly, a longitudinally rotating head with one or more pickup heads could be located adjacent each of the rollers 66, 68 and 70 by means of a rotating sphere (not shown), the axis of which would be parallel to the axis of the rollers to thus sweep the surface of the rollers for longitudinally positioned flaws induced on the rollers. Also, while not shown, suitable erasers would be positioned adjacent each of the magnetic rollers to erase the induced flux signals which have been already detected and prepare that section of the roller for another cycle of flaw detecting. Or if preferred, in place of the alternate pickup heads 80 suitable erasers could be provided.

Referring now to FIGURES 9 and 10, an apparatus for and a method of utilizing the source of magnetic flux which magnetizes the specimen can be utilized to support the testing circuit and equipment on the test specimen during inspection. This use could be particularly advantageous in making magnetic inspections of large test specimens such as large pressure vessels and other equipment in which a portable tester would be advantageous.

Referring now to FIGURES 9 and 10, magnetizing means such as an electromagnet or permanent magnet 82 is provided to magnetize a test specimen 84. A loop of magnetic tape 86 is provided around rollers 88, 90 and 92. A suitable supporting means 94 is provided to support the continuous roll of tape and other testing equipment, all of which is supported in rolling contact against the test specimen 84 by wheels 96. The magnetizing means 82, while providing the source of magnetic flux to magnetize the test specimen 84, also holds the supporting structure 94 and all testing equipment against the test specimen 84 in a vertical or even overhead position so that the apparatus may be more easily handled and manipulated with a minimum of effort. This method would be particularly advantageous in measuring large flat surfaces or the inside or outside of large pressure vessels. In measuring curved surfaces of course the contact roller 92 would be moved relative to the wheels 96 to fit the contour of the specimen being measured. And of course suitable pickup head or rotating head 98 and eraser 100 is provided. Of course, if desired, the pickup head and eraser could be omitted and the tape could be made a strip tape rolling on one of and unwinding on the other of the rollers 88 and 90.

In use, referring to FIGURES 1–3 the test specimen 10 is magnetized by any conventional means such as passing current through the conductor 12 to make a magnetic field or by the use of the magnetizing coil 16 (FIGURE 3). The magnetic tape 14 is then placed in stationary contact with or in close proximity to the test specimen 10 either during or after magnetization of the specimen 10. It is noted that the tape may be placed longitudinally as in FIGURE 1, spirally as in FIGURE 2, or on rollers 18 and 20 which wind and unwind a tape about a test specimen 10 as it moves longitudinally as shown in FIGURE 3. Flaws in the specimen 10 such as slag inclusions, cracks, or voids will produce irregularities in the magnetic field of the test specimen 10. These variations are then induced in the tape 10 which has been demagnetized before being placed adjacent the specimen 10. Instead of using a strip of tape 14 the tape may be made in a continuous closed loop as shown in FIGURES 4, 9 and 10.

Referring now to FIGURE 6, the strip of magnetic tape is removed from the specimen and passed through a pickup 40 which detects the magnetic field induced in the tape by flaws in the test specimen 10. These flaw detections may be recorded directly on the tape, the tape replaced on the test specimen 10 and the exact location of the flaws marked. This exact location of the flaws can be accomplished because the demagnetized tape 14 is placed adjacent the specimen in a stationary contact, that is, there is no slippage between the surfaces of the tape and the specimen when the flaw signals are being induced. However, as shown in FIGURE 6, a paper tape 30 may simultaneously be passed by a marker 44 at the same speed that the magnetic tape passes by the pickup 40. Thus, when the pickup detects a flaw signal that signal is passed to amplifier 42 and to the marker 44 which marks the paper tape 40 in accordance with the flaws detected on the magnetic tape. This paper tape 30 can then be laid or wound onto the test specimen 10 in the same position that the margnetic tape 14 was laid for detection thereby giving a precise location of the flaw and can be saved for future reference while the magnetic tape 14 is being erased for another cycle.

Referring to FIGURES 4, 9 and 10 a closed loop of tape 14 is being rolled across the surface of a test specimen and suitable pickup or detectors 26 (FIGURE 4) and 98 (FIGURES 9 and 10) are utilized to pick up and detect the flaw signal which has been induced in the magnetic tape 14 and 86 (FIGURES 9 and 10). The detected signal can then be manually or automatically marked upon the test specimen at the proper location which would be the distance at which that particular section of tape moves from its point of contact to a point adjacent the detector where the signal is detected. Thus it is to be particularly noted that in all of the figures the magnetic tape is arranged with a stationary contact with the test specimen and therefore the position of the induced flaw signal on the magnetic tape will be an indication as to the exact position of the flaw in the test specimen. And of course, after the signal has been picked up and detected the magnetic tape is erased by erasers 28 (FIGURE 4) and 100 (FIGURES 9 and 10) so that the closed loop may be reused for another cycle of detection.

Referring now to FIGURE 7, the use of a rotating head and preferably of two rotating heads is best seen. As previously noted the speed of the tape, particularly in a closed loop system, by the detector head is not satisfactory to give the most desirable signal and signal-to-noise ratio. Therefore, rotating heads such as heads 46 and 50 are provided on which a plurality of pickup elements 48 and 52, respectively, are secured. Thus, as the heads are rotated the pickup elements are passed over the scan the tape at a faster speed than the speed of movement of the tape alone and thus provide a more sensitive method of detecting the flaw signals as they increase the signal output. Also, as previously discussed, it is desirable to have a rotating head in both a transverse and longitudinal direction to the magnetic tape 14 in order to pick up both transverse and longitudinal flaw signals as optimal signals from the tape. However, it is noted that the rotating head 50 is positioned longitudinally to the tape 14. Therefore it is desirable that the tape be shaped as to conform to the outer periphery of rotating head 50 so that each portion of a cross-section of the tape is an equal distance from the pickup heads 52 as the tape passes by the rotating head 50.

Referring to FIGURES 8 and 11, the use of rollers made of suitable plastic or rubber with an outer circumference of magnetizable particles or tape may be used to pass over the surface of the test specimen instead of using the bulky rolls of magnetic tape. This is shown in FIGURE 11 where offset magnetic rollers 54 and 56 may be rotated around the outer circumference of test specimen 10 after it has been magnetized, thereby inducing flaw signals into the circumference of the roller as it contacts the test specimen 10. Similarly, pickups 58 and 60 are spaced adjacent the magnetic rollers 54 and 56, respectively, to detect and note the flaw signals. Also, erasers 62 and 64 are respectively used with rollers 54 and 56 to demagnetize the circumference and prepare the roller for additional reuse.

Referring to FIGURE 8, the magnetic rollers 66, 68 and 70 are shown as used for making longitudinal detecting sweeps across a curved test specimen 10, here shown as a pipe. It is noted that the contour of the circumference of the rollers 66, 68 and 70 is such as to complement and fit the contour of the specimen 10. The use of rotating head discs 72, 74 and 76 with the rollers 66, 68 and 70 is noted. The discs are rotated on their axis 81 and thus in a plane perpendicular to the axis of the magnetic rollers. One or more pickup heads 80 are disposed in the outer circumference of the rotating discs 72, 74 and 76 to provide a sensitive pickup method and apparatus. And of course, longitudinal detecting heads (not shown) may be used to provide a longitudinal sweep of the magnetic rollers. In that event, suitable rotating spheres which would rotate around the axis parallel to the axis of the rollers 66, 68 and 70 and having detecting heads perpendicular to the detecting heads 80 would be used. And as previously noted, the rollers 66, 68 and 70 could be enlarged to cover the entire circumference of the pipe 10 or an additional set of three rollers would be used on the second end of the pipe 10 which would be offset 60° to the rollers shown so as to make a complete test of the circumference of the pipe in one transverse movement of the pipe along the rollers, or of the rollers along the pipe.

Referring now to FIGURES 9 and 10, the method of and apparatus for supporting the testing equipment by the use of the same magnetic force used to magnetize the specimen during the inspection is shown. Here, the magnetizing means, shown as a magnet 82, magnetizes the specimen 84. At the same time the magnetizing means 82 holds the supporting structure 94 and testing equipment against the test specimen 84. The test equipment may be moved along the test specimen by means of rollers 96. Thus, as the tape 86 is rolled over the test specimen surface, the test specimen is magnetized, so as to induce flaw signals into the tape 86 which can then be detected by the detector head 98 to produce a suitable signal or mark. Then the tape is erased by eraser 100 for continuous use as it is moved along the specimen 84.

Thus a method of and apparatus for inspection is shown in which the ferromagnetic specimen can be quickly and easily subjected to a magnetic inspection and in which there are no limitations on the size or length of the object to be inspected and in which a nondestructive testing may be had and in which great sensitivity and speed of testing can be achieved. It is also noted that this method and apparatus detects and provides the exact location of the flaw on the test specimen.

It is believed that the method of the invention is apparent from the foregoing description of the disclosure of the method and apparatus of the present invention. The method, however, generally comprises the steps of magnetizing the test specimen, placing a demagnetized ferromagnetic testing means adjacent the test specimen thereby inducing a magnetic pattern in the testing means in accordance with the flaw pattern in the test specimen, then testing the ferromagnetic test means to determine the exact position of the flaws detected, and correlating the position of the detected flaw on the testing means with the test specimen to determine the exact position of the flaw on the test specimen. In addition, the method comprehends the testing of the ferromagnetic testing means by one or more rotating heads which may be placed both longitudinal and transverse to the testing means. The method further comprehends utilizing the magnetizing force which magnetizes the test specimen to support the test equipment adjacent the test specimen.

The present invention, therefore, is well adapted to carry out the objects and attain the ends and advantages mentioned as well as others inherent therein. While presently preferred embodiments of the invention are given for the purpose of disclosure, numerous changes in the details of construction, arrangement of parts and steps of the process may be made which will readily suggest themselves to those skilled in the art and which are encompassed within the spirit of the invention and the scope of the appended claims.

What is claimed is:

1. Apparatus for progressively laying a magnetizable medium on a ferromagnetic member comprising, a carriage;

a spool of magnetic tape rotatably mounted on said carriage;

a pick-up spool rotatably mounted on said carriage, spaced from said magnetic tape spool and receiving one end of said magnetic tape;

a roller disposed between said spools and mounted on said carriage to press said tape in contact with the surface of the ferromagnetic member;

means for driving said spools to wind said magnetic tape on said pick-up spool and progressively lay said magnetic tape on the ferromagnetic member; and, members attached to said carriage and arranged for contact with the ferromagnetic member surface to carry a substantial portion of the weight of said carriage;

means on said carriage to magnetize the ferromagnetic member for the detection of flaws.

2. The method of magnetically testing ferromagnetic objects for flaws comprising,
magnetizing said object;
continuously simultaneously spirally placing a demagnetized ferromagnetic tape adjacent said object and removing it therefrom thereby inducing a magnetic pattern in the tape in accordance with flaw pattern in the object,
testing the tape to determine the exact position of the flaws detected on the tape, and
correlating the position of the flaw recorded on the tape with the object to determine the exact position of the flaws on the object.

3. The method of magnetically testing a ferromagnetic object for flaws, comprising
magnetizing the object,
passing a roller having a demagnetized ferromagnetic surface over the object thereby inducing a magnetic pattern in said roller surface in accordance with the flaw pattern in the object so that there is negligible slippage between said surface of the roller and the surface of the object,
inspecting the magnetic pattern induced in said roller surface by rotating a detector transversely across said surface of said roller, and
simultaneously rotating a detector longitudinally across said surface of the induced roller, thereby determining the positions of the flaws in the object.

4. The method of magnetically testing a ferromagnetic object for flaws, comprising
magnetizing the object,
spirally wrapping a portion of a substantial length of a demagnetized ferromagnetic tape on the object, said tape being sufficiently sensitive to transfer the surface magnetic flux pattern to said tape, and
pulling said tape at one end so as to cause the object to move axially of said spiral wrapping and so as to wrap the unmagnetized portion of said tape over the surface of the object not previously wrapped.

5. Apparatus for inspecting a ferromagnetic member, comprising
a source of unmagnetized tape,
take-up means for said tape, the end portion of said tape being wrapped spirally around the ferromagnetic member and coupled to said take-up means,
means mounting said tape source and said take-up means in spaced relation, and
means driving said take-up means to draw said tape from said tape source,
the ferromagnetic member being mounted for movement axially of the spiral wrapping as said tape is drawn.

6. The method of magnetically testing a ferromagnetic object comprising the steps of
magnetizing the object,
placing a substantially demagnetized ferromagnetic tape adjacent the object thereby recording a magnetic pattern in said tape in accordance with the flaw pattern in the object,
establishing relative movement between the recorded tape and a magnetic pickup head capable of detecting the magnetic pattern on the tape.
establishing a relative movement between a sheet on which a permanent record of the flaw pattern is to be transcribed and a marking device,
coordinating the relative movement between the sheet and the marking device with the relative movement between the tape and the pickup head,
operating the marking device to mark the sheet when a flaw recorded on the tape is detected by the pickup head,
placing the sheet on the ferromagnetic member in the location formerly occupied by the tape to precisely locate the positions of any recorded flaws.

7. A method of magnetically testing ferromagnetic objects for flaws, comprising
progressively laying an unmagnetized portion of a magnetizable medium on a surface area of a magnetized ferromagnetic object, said medium being continuously lengthwise laid on said object;
removing said laid magnetizable medium portion; and
scanning simultaneously along the transverse and longitudinal dimensions of said removed medium portion for defects recorded thereon along the longitudinal and transverse dimensions, by passing said removed magnetizable medium portion near at least two moving magnetic detectors disposed to sense longitudinal and transverse defects recorded in said magnetizable medium;
one of said magnetic detectors having a scanning surface relatively moving substantially parallel to the length of said magnetizable medium and another of said detectors having a scanning surface relatively moving substantially transverse to the length of said magnetizable medium.

8. Apparatus for locating defects in a ferromagnetic member, comprising
means for progressively laying a magnetizable medium on a surface of a magnetized ferromagnetic member,
said magnetizable medium being a roller having a magnetizable surface shaped to fit the contour of said ferromagnetic member and being relatively movable with respect to the ferromagnetic member,
said medium being sufficiently sensitive so as to record the surface flux distribution in said member;
means for removing said magnetizable medium from the ferromagnetic member surface; and
detection means positioned to detect the magnetic character of said removed magnetizable medium,
said detection means simultaneously sensing transversely and longitudinally of said magnetizable medium for flaws recorded on said magnetizable medium,
said detection means including a detector scanning surface that has relative movement transversely of said roller magnetizable surface and another scanning surface that, simultaneously with said first mentioned scanning surface, has relative movement circumferentially of said roller magnetizable surface.

9. Apparatus for locating defects in a ferromagnetic member, comprising
means for progressively laying a magnetizable tape of substantial length on a surface of a magnetized ferromagnetic member,
said tape being sufficiently sensitive so as to record the surface flux distribution in said member;
means for removing said tape from the ferromagnetic member surface; and
detection means positioned to detect the magnetic character of said removed magnetizable tape,
said detection means simultaneously sensing transversely and longitudinally of said magnetizable tape for flaws recorded on said magnetizable tape,
said detection means being disposed adjacent the removed portion of said magnetizable tape,
said detection means comprising a first detector scanning surface that has relative transverse movement over said tape and a second detector scanning surface that, simultaneously with said first detector scanning surface, has relative longitudinal movement over said tape.

(References on following page)

References Cited by the Examiner

UNITED STATES PATENTS

| | | | |
|---|---|---|---|
| 2,031,469 | 2/1936 | Drake | 324—37 |
| 2,160,540 | 5/1939 | Drake | 324—37 |
| 2,539,837 | 1/1951 | Howell | 179—100.2 |
| 2,648,435 | 8/1953 | Kodis | 324—37 |
| 2,919,314 | 12/1959 | Holt | 179—100.2 |
| 2,994,032 | 7/1961 | Hansen | 324—38 X |
| 3,005,056 | 10/1961 | Goldmark | 179—100.2 |

WALTER L. CARLSON, *Primary Examiner.*

SAMUEL BERNSTEIN, FREDERICK M. STRADER, *Examiners.*

A. E. SMITH, R. B. LAPIN, F. A. SEEMAR, R. J. CORCORAN, *Assistant Examiners.*